United States Patent [19]
Wilhelm et al.

[11] Patent Number: 5,943,844
[45] Date of Patent: *Aug. 31, 1999

[54] METHOD OF WRAPPING A FOOD PRODUCT, PACKAGING MACHINE USED AND PACKAGE FORMED

[75] Inventors: Kenneth M. Wilhelm; Daniel E. Keene, both of Culpeper, Va.

[73] Assignee: Ross Industries, Inc., Midland, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/655,933

[22] Filed: May 31, 1996

[51] Int. Cl.$^6$ .................................................. B65B 53/02
[52] U.S. Cl. ............................... 53/442; 53/471; 53/485; 426/396
[58] Field of Search ............................... 53/442, 557, 471, 53/485, 281, 300, 329.3, 329.4, 329.5; 426/106, 396; 156/69

[56] References Cited

U.S. PATENT DOCUMENTS

| | | |
|---|---|---|
| 3,197,940 | 8/1965 | Spangler .............................. 53/442 X |
| 3,283,469 | 11/1966 | McBrady et al. . |
| 3,336,729 | 8/1967 | Logemann . |
| 3,354,614 | 11/1967 | Clair et al. ............................. 53/557 X |
| 3,355,858 | 12/1967 | Jahn . |
| 3,672,113 | 6/1972 | Andra . |
| 3,834,120 | 9/1974 | De Faccio et al. . |
| 3,866,387 | 2/1975 | Davis . |
| 3,868,917 | 3/1975 | Arfert . |
| 4,121,404 | 10/1978 | Davis . |
| 4,282,699 | 8/1981 | Embro, Jr. . |
| 4,309,860 | 1/1982 | Soga . |
| 4,359,852 | 11/1982 | Hoffman et al. ...................... 53/442 X |
| 4,870,800 | 10/1989 | Kasai ................................. 53/329.3 X |
| 5,155,974 | 10/1992 | Garwood ............................ 53/329.3 X |
| 5,439,132 | 8/1995 | Gorlich ................................ 53/256 X |
| 5,591,468 | 1/1997 | Stockley et al. ..................... 53/442 X |

FOREIGN PATENT DOCUMENTS

| | | | |
|---|---|---|---|
| 79687 | 7/1978 | Japan ..................................... 53/442 |
| 22289 | 2/1979 | Japan ..................................... 53/442 |

*Primary Examiner*—Linda Johnson
*Attorney, Agent, or Firm*—Jones, Tullar & Cooper, P.C.

[57] ABSTRACT

The present invention has several aspects. One aspect relates to a method of wrapping a package containing a food product which is attractive and serves to present the food product in an appealing setting. The package includes a preformed tray and a heat sensitive transparent film sheet which is attached at at least one attachment region to the tray without wrinkles in the film sheet. A packaging machine, a cutting and heating assembly and the package itself comprise the other aspects of the invention. In each case, the transparent film sheet is wrinkle free.

7 Claims, 5 Drawing Sheets

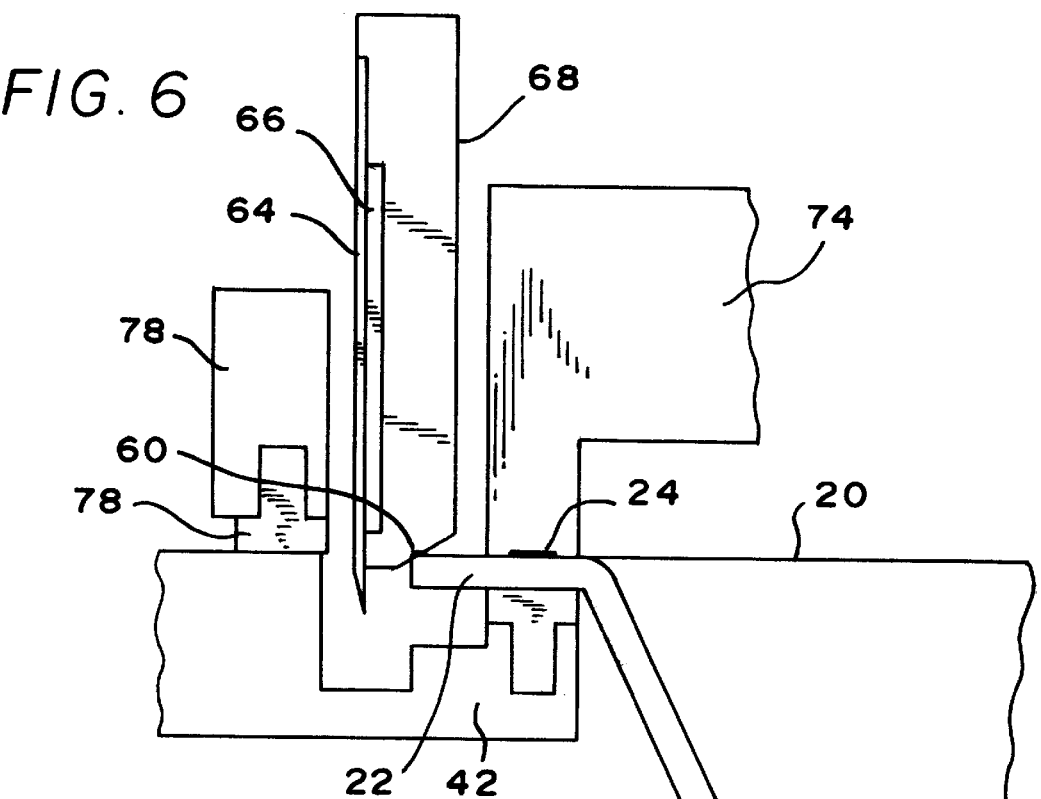
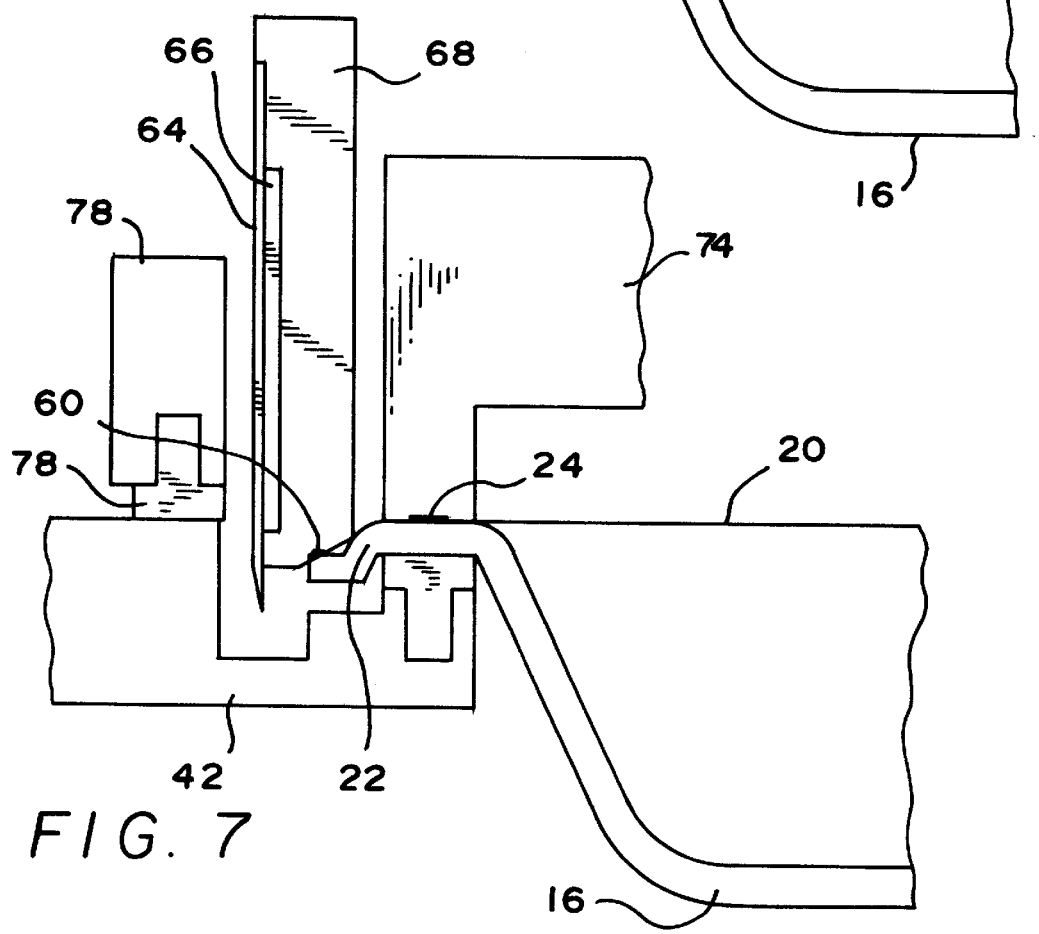

METHOD OF WRAPPING A FOOD PRODUCT, PACKAGING MACHINE USED AND PACKAGE FORMED

FIELD OF THE INVENTION

The present invention relates generally to the field of food packaging, and in particular to that part of food packaging relating to perishable foods.

BACKGROUND OF THE INVENTION

The packaging of food of any kind has a generally two fold enhancement purpose: 1) preservation; and 2) salability. Both of these purposes are most evident when the food is a perishable food, such as meats, poultry, fish, fruits, vegetables and the like.

Food processors and packagers are in a continuous mode insofar as both of these purposes are concerned, i.e., they are continuously attempting to improve in both areas. One such attempt is shown in FIG. 1, which illustrates a meat product packaged according to a conventional method. Specifically, the package includes a tray 10 containing a food product 12 wrapped with a transparent film sheet 14. This package illustrates what is known as the overwrapping technique, i.e., the film sheet 14 is wrapped tightly about the food product and gathered under the tray 10 where it is allowed to adhere to itself due to its inherent holding quality (stickiness), or held by an adhesive. This type of packaging allows for maximum visibility of the food product. However, the package is somewhat unsightly, and especially so when the food product is of the meat variety. Frequently, these packages become saturated with liquid from the meat product (blood, for example) which adds to the unsightliness, and to consumer discomfort in handling the package. The film sheet itself covering the food product becomes wrinkled to a greater or lesser extent, which also contributes to the unsightliness of the package.

FIG. 2 shows an attempt by the industry to improve on the deficiencies of the packaging shown in FIG. 1. The package of FIG. 2 shows a preformed tray 16 containing a food product 18 covered on its top surface by a transparent film sheet 20. The tray 16 includes a peripheral flange 22 to which the film sheet 20 is attached, such as by a heat seal 24, leaving an overhang portion 26 of the film sheet. For this purpose, the film sheet 20 is heat sensitive. This package is an improvement over the package of FIG. 1 because it does not experience the unsightliness and handling problems found in FIG. 1. Still, it possesses its own unsightliness in the form of the overhang 26 and the wrinkling 28 which are inevitably formed close to the inner surface of the flange 22. Unlike the packaging of FIG. 1 the package of FIG. 2 is usually evacuated and back filled with modified atmosphere to some degree for better preserving the food product. In the process, however, and because of the nature of the material of the film sheet 20, the seal 24 around the flange, reduction of pressure due to gas absorption and colder storage temperatures, the film sheet 20 is subject to the wrinkling 28. The wrinkling 28 then contributes to the unsightliness of the package according to FIG. 2. It also detracts from an optimized visibility of the food contained in the package.

It would be desirable, therefore, to have a package with the food visibility of FIG. 1, the structural integrity of FIG. 2 but without the unsightliness of both the package according to FIG. 1 and FIG. 2.

SUMMARY OF THE INVENTION

It is, therefore, an object of the present invention to provide the state-of-the-art with a solution to the problems noted above. Specifically, the present invention has as specific objects the provision of a method, associated structure and a package each of which overcomes the problems noted above, There are several aspects to the present invention. It is directed to a method of wrapping a food product contained in a preformed tray with a transparent heat sensitive film sheet which is free of wrinkles. It is also directed to a packaging machine with a cutting and heating assembly used in the packaging machine to effect part of the method by cutting the transparent film sheet around the preformed tray perimeter and by generating the heat necessary to insure a wrinkle free transparent film sheet and to further secure the transparent film sheet to the preformed tray. It is also directed to the package itself including the preformed tray and the transparent film sheet free of wrinkles.

According to the method, the transparent film sheet is heated twice. For this purpose, the tray typically has a flange which extends about and defines a perimeter of the tray. The transparent film sheet is attached to the tray along the flange to form a first attachment region which may include sealing (first sealing) of the transparent film sheet to the flange of the tray. Thereafter, the film sheet is again heated (reheated), but not sufficiently to affect the existing attachment nor the environmental condition within the package, causing the attached film sheet to contract inwardly toward its center against the holding force exerted by the attachment at the attachment region resulting in a smooth film covering, at least inwardly of the first attachment. Preferably, the film sheet that extends outwardly of the flange is cut off from the remainder of the film sheet, a second attachment may be produced on the flange outward of the first attachment and the reheating noted above performed.

The packaging machine includes a food filling station, a station for applying a film sheet to a preformed tray containing the food and forming a first attachment region of the film sheet on the tray, and a further station for removing wrinkles in the film sheet and preferably forming a second attachment region of the film sheet on the tray.

The cutting and heating assembly forms a part of the packaging machine and includes both a reciprocating knife sub-assembly designed to cut along the flange edge of the preformed tray, and a heating sub-assembly designed to reheat the film sheet, cause shrink back and preferably produce the second attachment region which may include sealing (second sealing) of the transparent film sheet to the flange of the tray.

The resulting package comprises a preformed tray and a transparent film sheet cover contracted, at least inwardly of the first attachment location, to produce a smooth surface free of wrinkles, and preferably a cover attached to the flange of the preformed tray at two locations without an overhang portion.

The package when completed has a neat and attractive appearance. The contents of the package are readily viewable through the smooth film sheet cover, thereby enhancing the confidence of the consumer in the quality of the contents of the package.

DESCRIPTION OF THE DRAWINGS

Eight figures have been selected to better understand the present invention in its various aspects. These are:

FIG. 6 which is a partial view in elevation of the knife assembly showing greater detail of the knife assembly and the tray flange;

FIG. 7 which is a view similar to FIG. 6 showing a modified flange; and

DETAILED DESCRIPTION OF THE VARIOUS ASPECTS OF THE INVENTION

Figure 1:
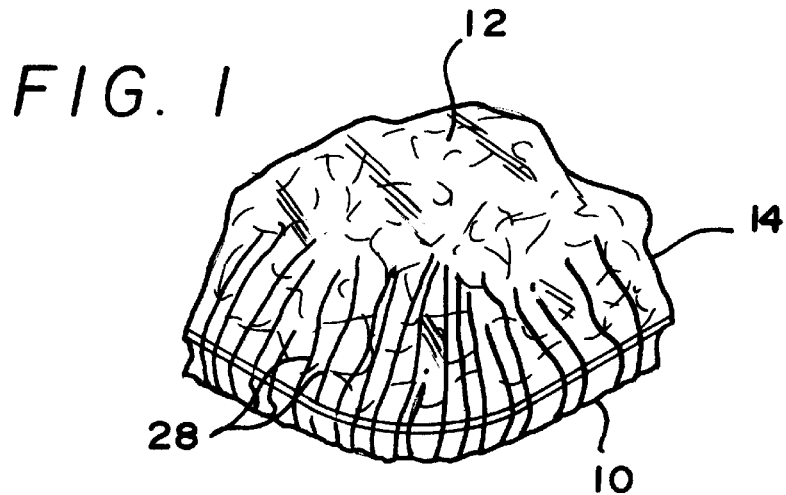
FIG. 1 which is a perspective partial view of a packaged food product according to one known packaging technique.
Figure 2:
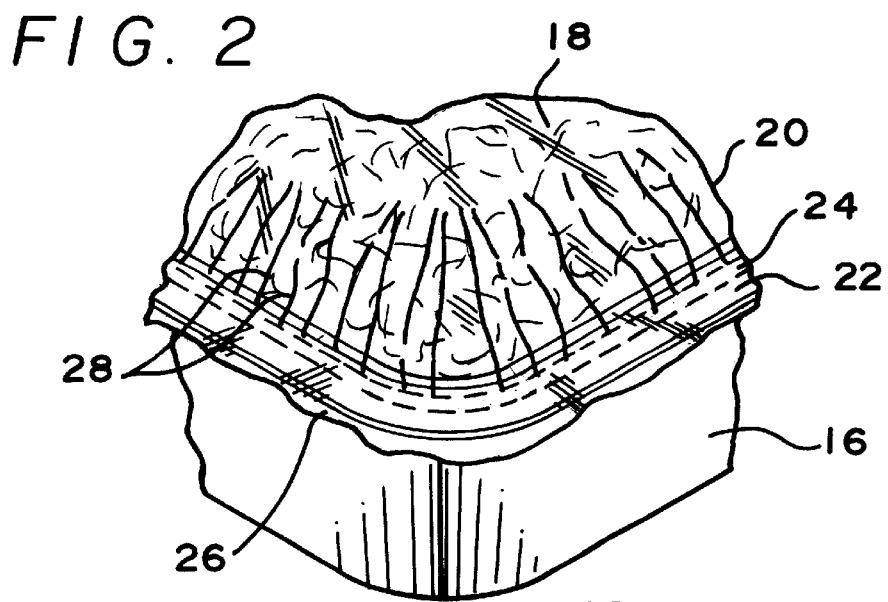
FIG. 2 which is a perspective partial view of a packaged food product according to another known packaging technique.
Figure 3:
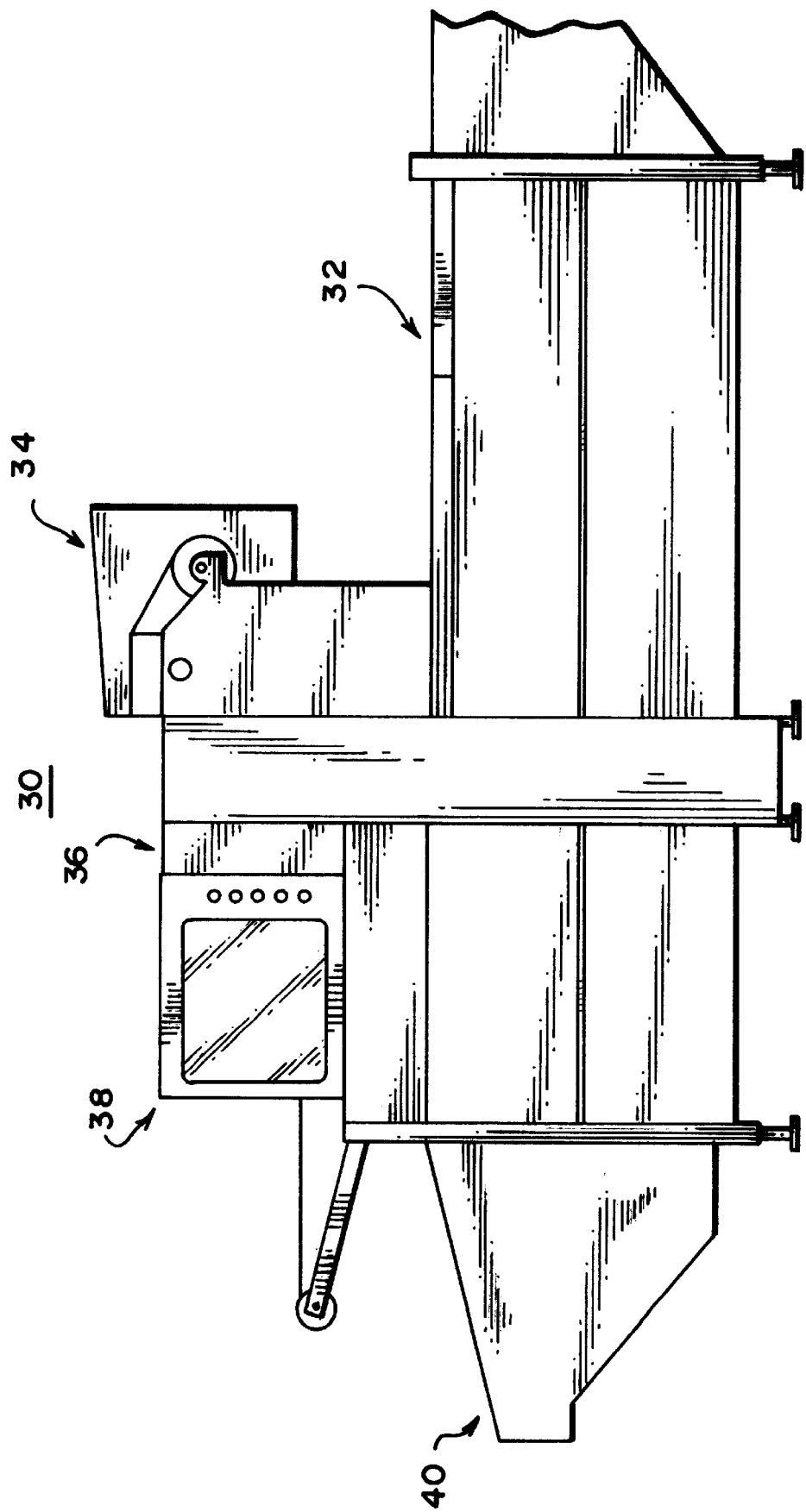
FIG. 3 which is a side elevational view of a known packaging machine which produces a packaged food product like that shown in FIG. 2, and which can be adapted to produce a packaged food product according to the present invention.

A packaging machine 30 (FIG. 3) is the type of machine used to produce the packages of FIG. 2. Such a machine is manufactured by the assignee of the present invention under the name the INPACK™ packaging machine. This machine can handle a variety of different shaped preformed trays. The trays may be loaded onto a conveyor station 32 either manually or by automatic means (not shown). The conveyor station includes one or more carriers for the preformed trays. The carriers form parallel lanes of the conveyor station, which can be individually controlled, to lead the preformed trays to a loading station 34 where the trays are loaded with a food product. From the loading station 34 the preformed and loaded trays are conveyed to a sealing station 36 where the preformed trays are evacuated and back filled with a modified atmosphere, a film sheet is applied to the preformed trays, and an attachment made (heat seal 24 of FIG. 2). From the sealing station 36, the trays are conveyed to a cutting station 38 where the film sheet 20 is cut about the perimeter of the preformed tray producing the overhang portion 26 (FIG. 2). From the cutting station 38 the trays are conveyed to an ejection station 40 where the loaded and covered trays are removed, either manually or automatically, from their carriers.

This packaging machine is presently on the market and need not be discussed in any greater detail. The sealing mechanism includes seal bars which are self-aligning and centered to ensure an accurate hermetic seal every time. Each seal head is individually controlled for temperature and timing. Included is a toggle design in a lift system which separates the seal heads from the product during stall/stop conditions on the production line to avoid the possibility of heat transfer and product breakdown. Sealing forces of up to ten tons of pressure can be generated, while package evacuation can be totally controlled to achieve any level of vacuum up to 29.99 inches of mercury. Oxygen residual levels of less than one percent can be consistently achieved from tray to tray. The vacuum gas system is designed to accurately evacuate the package and mechanically gas back filled to optimum levels.

Figure 4:
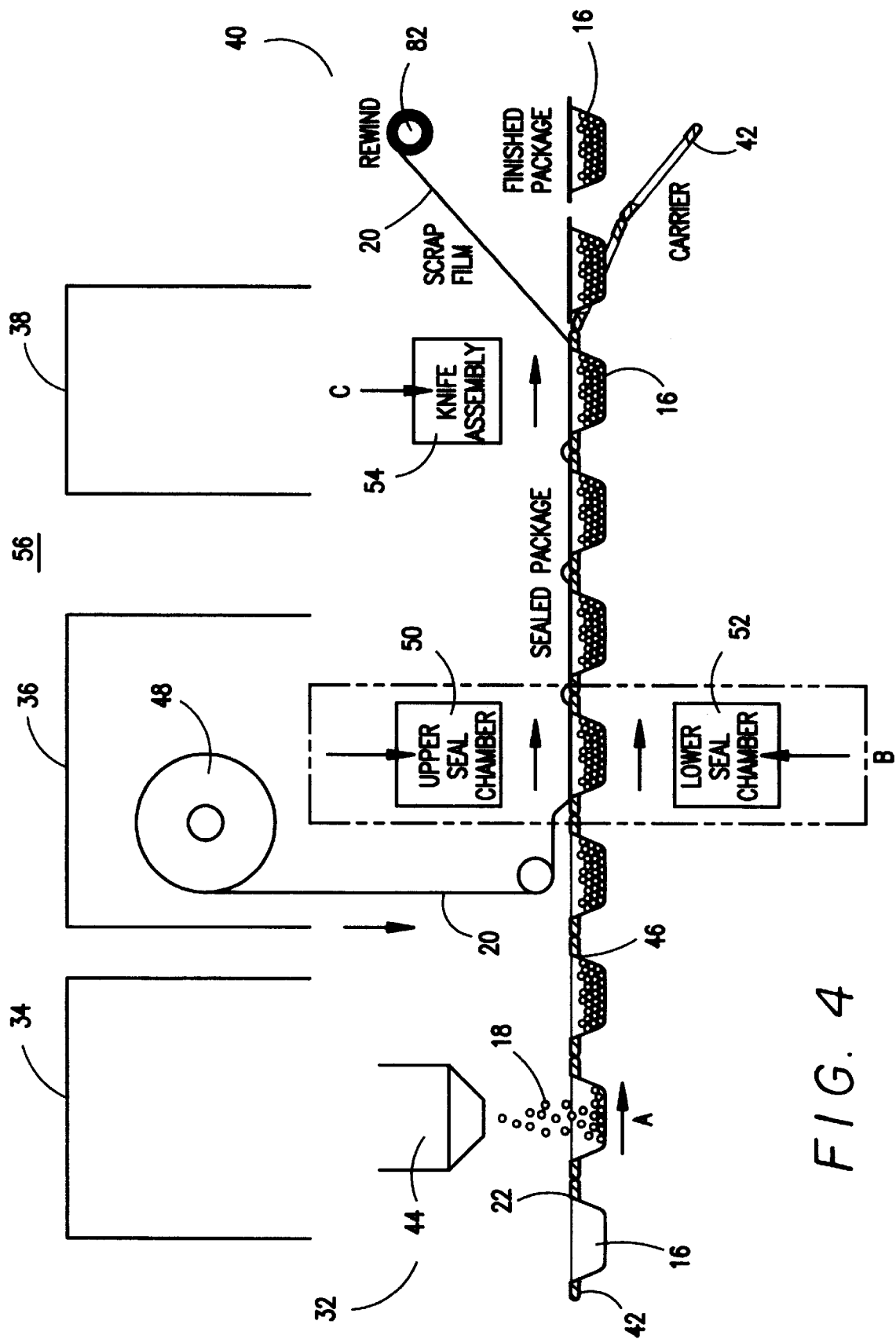
FIG. 4 which is a schematic view of the various stations in the packaging machine of FIG. 3 adapted to produce a packaged food product according to the present invention.

The schematic illustration of FIG. 4 will further illustrate the operation noted above but with the modification according to the present invention. At the loading station 34, the preformed trays 16 are transported by their associated carrier 42 to location A where a device 44 is used to load the tray with a food product 18. The carrier 42 includes a set of aligned cutouts 46 adapted to receive the trays 16 and support the trays at their flanges 22. As noted above, each carrier forms a lane, with parallel lanes operating at any given time.

Such an arrangement maximizes production efficiency since a problem in any one lane does not require total machine shut down.

From the loading station 34, the carriers proceed to sealing station 36. This station will be discussed broadly without a consideration of the evacuation, seal bars and self-aligning and centering mechanisms. Generally, the sealing station is provided with a transparent film sheet supply roll 48 which has sufficient width to cover all the lanes. The transparent film sheet 20 is drawn from the roll 48 and joined to a tray 16 in an associated lane at location B, i.e., the sheet 20 contacts the flange 22 and covers thereby the tray opening of the trays in each lane. At this location, an upper seal chamber 50 and a lower seal chamber 52 are moved toward each other. These chambers contain the seal bars and have the necessary evacuating equipment operatively associated therewith. The lower seal chamber 52 includes a cavity (not shown) sized to receive the bottom part of a tray 16. The upper and lower seal chambers 50 and 52 clamp the film sheet and carrier a and the seal bars in the upper chamber descend to engage the flange 22 of the tray and press the sheet 20 against the flange 22. Heat is then applied to form the attachment region 24 (preferably, heat seal) of the sheet 20 to the flange 22 (FIG. 6).

To this point, the packaging machine is equivalent to packaging machine 30. According to the present invention, the packaging machine 30 is modified to include a knife head assembly 54 downstream of the sealing station 36. With the knife head assembly 54, the packaging machine 30 is transformed into packaging machine 56.

Figure 8:
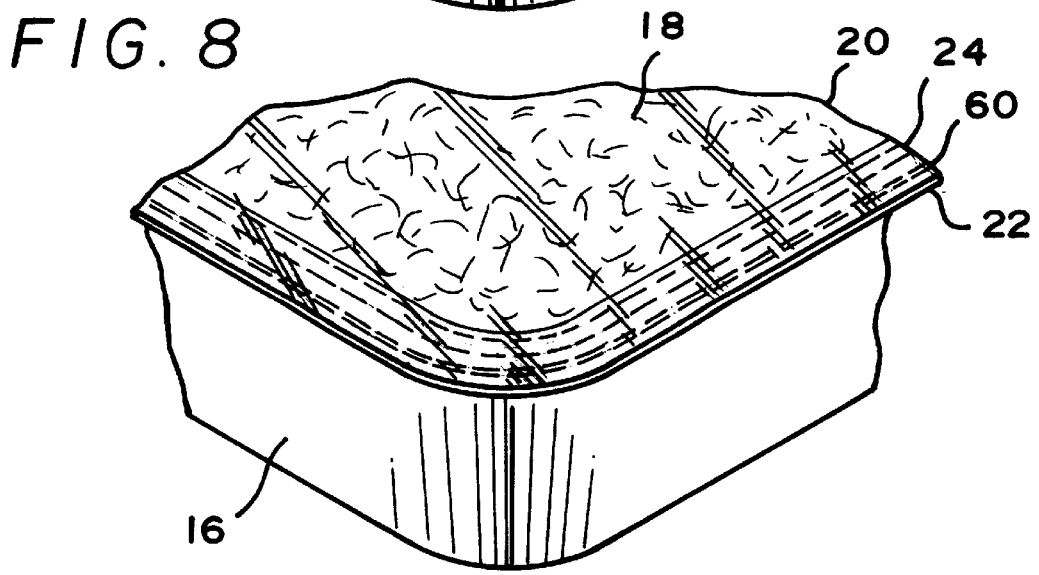
FIG. 8 which is a perspective partial view of a packaged food product according to the present invention.
Figure 5:
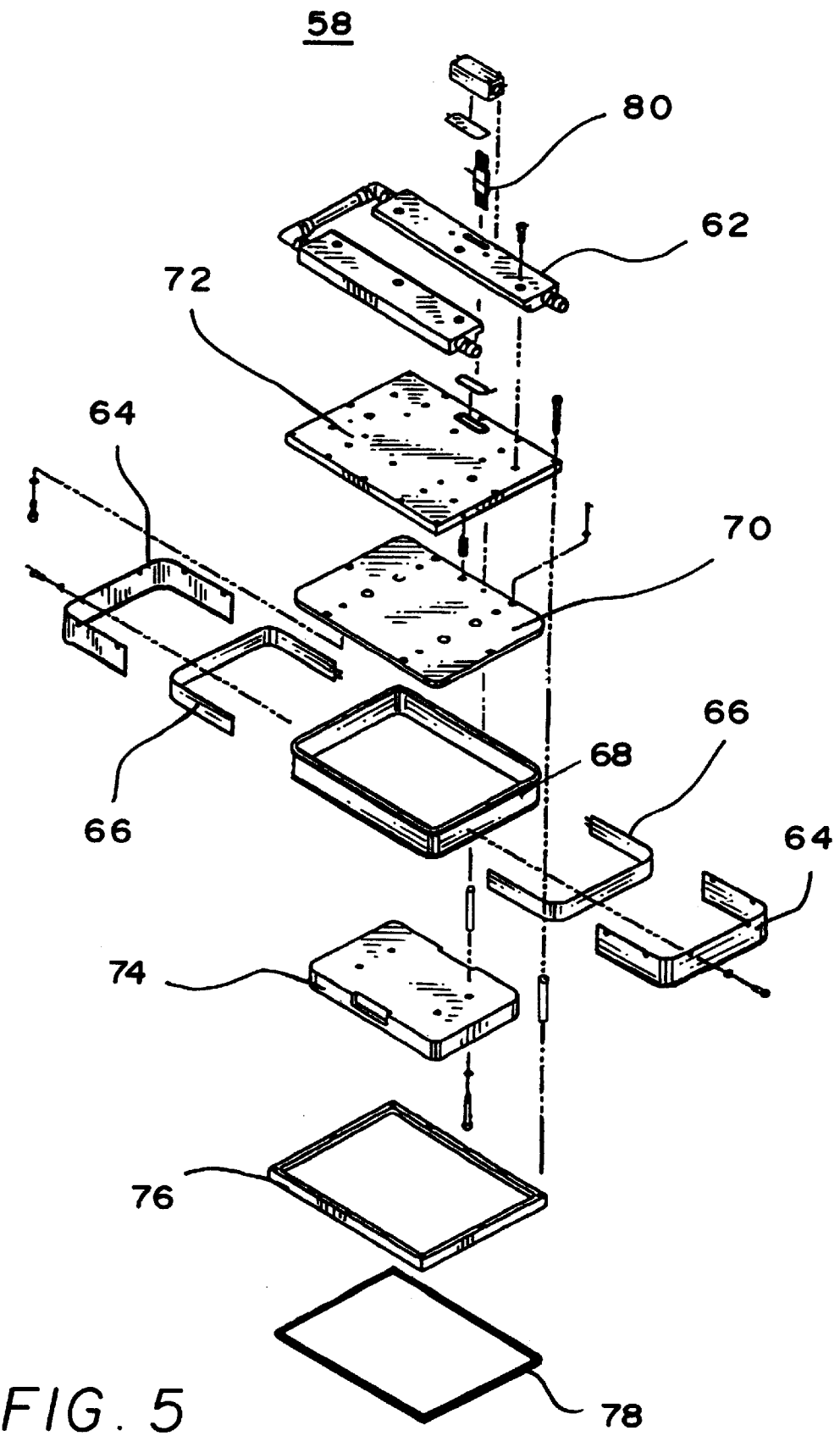
FIG. 5 which is an exploded view of the knife assembly according to the present invention.

The knife head assembly 54 is located at the cutting station 38 and includes a combined reciprocating knife subassembly (cutting) and heating subassembly 58 (FIGS. 5, 6 and 7). The combined subassemblies 58 register at location C with a preformed tray 16, which has been indexed to the location C (moved incrementally), heat the film sheet 20 already attached to the flange 22, and form an attachment region 60 (FIGS. 6, 7 and 8). The package of FIG. 8 contains, therefore, a first attachment region 24 of the film sheet 20 to the flange 22 as well as a second attachment region 60 of the film sheet 20 to the flange 22. These attachment regions, preferably, are formed as heat seals.

When heat is applied to the film sheet 20 already attached to the flange 22 at attachment region 24, the film sheet, which is heat sensitive, contracts toward its center because of the nature of the film material and the holding force exerted by the first attachment region 24. This contraction tends to substantially eliminate any wrinkles which may have been formed when the first attachment region 24 was made at location B. The second attachment region 60 holds the film sheet 20 to the flange edge.

Details of the knife head assembly 54 including the combined subassemblies 58 are shown in FIGS. 5, 6 and 7. The essential parts of this assembly include a knife hanger 62, to which a knife set 64 is attached. Inboard of the knife set 64 there is located a strip heater set 66. Both the knife set 64 and the strip heaters 66 are mounted to a knife holder 68. The knife holder 68 is similar in its peripheral shape to that of the preformed tray. Fitted within the knife holder 68 are insulator plate 70 and baseplate 72, on which the knife hanger 62 is mounted. An inner clamp 74 and an outer clamp 76 are provided for securing the assembly in position. Finally, a seal 78 is provided to insure that the film sheet 20 is held firm while cutting and heat sealing, and to insure that heat from the strip heater set 66 is retained inboard toward the center of the assembly and consequently toward the center of the film sheet 20.

Turning back to FIG. 4 and location C, as well as FIG. 7, when the combined cutting and heating subassemblies 58 are lowered toward the carrier 42 to engage the tray 16 filled with a food product and with a film sheet covering 20 defining a first attachment region 24, the knife set 64 cuts the sheet 20 and the knife holder 68 and inner clamp 74 engage the flange 22 as shown in FIG. 7. The knife holder 68 is heated by the strip heater set 66 and the inner clamp 74 is in turn heated by the heat radiated from the knife holder 68. The heat from the inner clamp 74 is not sufficient to adversely effect the first attachment region 24 while the heat in the knife holder 68 is focused at the flange edge of file sheet 20. In the process, the contraction noted above occurs due to the heat from the inner clamp 74 and the wrinkles, that would ordinarily be found in the film sheet adjacent to the first attachment region, are effectively eliminated. As noted, the first attachment region is maintained intact so that the necessary reactive holding forces (pulling forces) can be generated in the film sheet itself. In addition, by retaining the first attachment region intact the conditions prevailing within the tray (for example, vacuum or modified atmosphere) are maintained.

The second attachment region 56 is formed either simultaneously with the noted wrinkle removing heating step, or soon thereafter (preferably substantially simultaneously) by the contact of the knife holder 68 with the film sheet. The film sheet portion overhanging the edge of the tray flange when cut by the knife set 64 recoils or shrinks back toward the flange edge and adheres to the flange edge due to the heat at the contacting surface of the knife holder 68 resulting in the package shown in FIG. 8 with no overhang.

The strip heaters 66 are preferably electrically heated. For this purpose, the strip heaters are connected to an electrical power source (not shown) by the terminal 80.

The finished package shown in FIG. 8 is then removed from location C and the packaging machine, while scrap film sheet is accumulated in a take-up roll 82.

As noted, the packaging machine including the knife head assembly can be easily adapted to handle any shape of preformed tray, such as round, oval, square with rounded corners, rectangular or any other shape. Also, the flange configuration can vary such as the configuration shown in FIG. 7. The result is the same, however, i.e., two attachment regions.

The package itself, as shown in FIG. 8, is attractive and serves to present the food product to be sold in an appealing setting.

The preformed tray can be made of a polystyrene material or the like, while the film sheet can comprise any heat shrinkable material, for example, CRYOVAC LID 1050, a product of W.R. Grace Company. Also, the packaging machine can be an in-line machine such as packaging machine 30, or a rotary-type machine.

When using the CRYOVAC LID 1050 material, the typical temperatures employed for the knife holder 68 are in the range of 300–400° F., while the temperature of the inner clamp 74 is less than 100° F.

What is claimed is:

1. A method of wrapping a package containing food, the package including a preformed tray defining a peripheral flange and a transparent film sheet, the method comprising the steps of:

attaching the transparent film sheet to the preformed tray along its flange to produce thereby a first attachment region;

heating the attached film sheet while maintaining the attachment at said first attachment region and causing the attached film sheet inward of said first attachment region to contract; and attaching the transparent film sheet to the preformed tray along its flange outboard of said first attachment region to produce thereby a second attachment region.

2. The method as defined in claim 1, wherein said first attachment region produces a first seal.

3. The method as defined in claim 1, wherein said second attachment region produces a second seal.

4. The method as defined in claim 2, wherein said second attachment region produces a second seal.

5. The method as defined in claim 2, wherein said first seal is produced by heating said transparent film sheet at said first attachment region.

6. The method as defined in claim 3, wherein said second seal is produced by heating said transparent film sheet at said second attachment region.

7. The method as defined in claim 1, further comprising the step of:

cutting the transparent film sheet along the outer edge of the flange.

* * * * *